(12) United States Patent
Osuga

(10) Patent No.: US 10,171,325 B2
(45) Date of Patent: Jan. 1, 2019

(54) MINIMUM DELAY VALUE CALCULATING DEVICE, INFORMATION TRANSMITTING DEVICE, MINIMUM DELAY VALUE CALCULATING METHOD, AND PROGRAM STORAGE MEDIUM

(71) Applicant: NEC Corporation, Minato-ku, Tokyo (JP)

(72) Inventor: Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 56 days.

(21) Appl. No.: 15/105,996

(22) PCT Filed: Dec. 24, 2014

(86) PCT No.: PCT/JP2014/006428
§ 371 (c)(1),
(2) Date: Jun. 17, 2016

(87) PCT Pub. No.: WO2015/098101
PCT Pub. Date: Jul. 2, 2015

(65) Prior Publication Data
US 2016/0323167 A1  Nov. 3, 2016

(30) Foreign Application Priority Data

Dec. 26, 2013  (JP) ................................ 2013-268402

(51) Int. Cl.
*H04L 12/26* (2006.01)
*H04W 28/02* (2009.01)

(52) U.S. Cl.
CPC ..... *H04L 43/0852* (2013.01); *H04W 28/0236* (2013.01)

(58) Field of Classification Search
CPC ... H04L 47/27; H04L 47/283; H04L 43/0864; H04L 46/16; H04L 47/10; H04L 47/11
See application file for complete search history.

(56) References Cited

U.S. PATENT DOCUMENTS 5,193,151 A *  3/1993  Jain ......................... H04L 47/10
                                                        709/237
7,634,631 B2 * 12/2009  Buyuktepe .......... H04L 43/0852
                                                        708/233
(Continued)

OTHER PUBLICATIONS

Lawrence S. Brakmo, Sean W. O'Malley, and Larry L. Peterson, "TCP Vegas: New Techniques for Congestion Detection and Avoidance", In Proc. of ACM SIGCOMM 1994, pp. 24-35, London, UK, Aug. 1994.

(Continued)

*Primary Examiner* — Wutchung Chu

(57) ABSTRACT

The purpose of the present invention is to appropriately detect propagation delay and the like (minimum delay value) in order to appropriately control a transmission rate of information. Upon input of a measured value of delay that is smaller than a value set as a minimum delay value, a minimum value setting unit (2) updates the set minimum delay value to the measured value of the delay. Delay refers to the time from transmission of information to arrival at the destination thereof, or the round trip time from transmission of information to receipt of reply information from the destination receiving the information by the originator. A timing determination unit (3) determines a review timing for reviewing the set minimum delay value on the basis of the measured value of the delay. A minimum value review unit (4) updates (reviews) the set minimum delay value at the determined review timing. The minimum delay value to be updated is a value calculated using the measured value of the measured delay or a preset initial value.

7 Claims, 4 Drawing Sheets

(56) References Cited

U.S. PATENT DOCUMENTS

| | | | | |
|---|---|---|---|---|
| 8,483,244 | B2* | 7/2013 | Rahbar | G06F 1/14 370/503 |
| 8,719,443 | B2* | 5/2014 | Xu | G06F 9/544 709/233 |
| 8,755,279 | B2* | 6/2014 | Joshi | H04J 3/0682 370/231 |
| 9,379,853 | B2* | 6/2016 | Ichino | H04L 1/1887 |
| 9,444,755 | B2* | 9/2016 | Anzai | H04L 47/365 |
| 2005/0018617 | A1* | 1/2005 | Jin | H04L 47/10 370/252 |
| 2005/0286416 | A1* | 12/2005 | Shinnonishi | H04L 1/1671 370/229 |
| 2011/0216650 | A1* | 9/2011 | Jin | H04L 12/56 370/230 |
| 2011/0261691 | A1* | 10/2011 | Jin | H04L 47/12 370/230 |
| 2011/0286449 | A1* | 11/2011 | Ichino | H04L 1/1874 370/389 |
| 2012/0158818 | A1* | 6/2012 | Baduge | H04L 12/1854 709/201 |
| 2015/0236966 | A1* | 8/2015 | Francini | H04L 47/27 370/235 |

OTHER PUBLICATIONS

Cheng Jin, David X. Wei, and Steven H. Low, "Fast TCP: Motivation, Architecture, Algorithms, Performance", In Proc. of IEEE INFOCOM 2004, vol. 4, pp. 2490-2501, Hong Kong, China, Mar. 2004.

Jeonghoon Mo, Richard J. La, Venkat Anantharam, and Jean Walrand, "Analysis and Comparison of TCP Reno and Vegas", In Proc. of IEEE INFOCOM 1999, vol. 3, pp. 1556-1563, USA, Mar. 1999.

Richard J. La et al., "Issues in TCP Vegas", 2001, Department of Electrical Engineering and Computer Sciences, University of California at Berkeley, pp. 1 to 17, <URL: http://citeseerx.ist.psu.edu/viewdoc/summary?doi=10.1.1.2.8588>.

Toru Osuga, "A Method Correcting Minimum RTT of TCP Congestion Control in Mobile Networks", IEICE Technical Report, Sep. 5, 2013, vol. 113, No. 205, pp. 87 to 92.

Ryo Yamamoto, "Adaptive Transport Protocol Using Round Trip Time for Ad Hoc Networks", The Transactions of the Institute of Electronics, Information and Communication Engineers, May 1, 2010 (May 1, 2010), vol. J93-B, No. 5, pp. 735 to 746.

International Search Report for PCT Application No. PCT/JP2014/006428, dated Feb. 24, 2015.

English translation of Written opinion for PCT Application No. PCT/JP2014/006428.

* cited by examiner

MINIMUM DELAY VALUE CALCULATING DEVICE, INFORMATION TRANSMITTING DEVICE, MINIMUM DELAY VALUE CALCULATING METHOD, AND PROGRAM STORAGE MEDIUM

This application is a National Stage Entry of PCT/JP2014/006428 filed on Dec. 24, 2014, which claims priority from Japanese Patent Application 2013-268402 filed on Dec. 26, 2013, the contents of all of which are incorporated herein by reference, in their entirety.

TECHNICAL FIELD

The present invention relates to a technique controlling a transmission rate when transmitting information through an information communication network.

BACKGROUND ART

In recent years, with the increase in the Internet bandwidth and the development of the technique of handling versatile information, users can acquire information including not only characters and still images but also sounds and moving images by using mobile terminals at anytime and anywhere. The technologies for supporting such information acquisition include the communication schemes such as LTE (Long Term Evolution) and LTE-A (Long Term Evolution-Advanced).

In LTE, for example, a link adaptation technique contributes to improving communication performance (e.g., communication speed) and quality (e.g., connectivity and SN (Signal-Noise) ratio). To give a specific example, a base station (called as eNodeB in LTE) changes a data modulation scheme from QPSK (Quadrature Phase-Shift Keying) to 64QAM (Quadrature Amplitude Modulation) based on distance to the user's mobile terminal, power of radio wave or the like. QPSK is a data modulation scheme that is less susceptible to noise and interference. 64QAM is a data modulation scheme that can send more data per symbol. Changing the data modulation scheme in that way leads to dynamic variation of the transmission capacity per network resource (amount of information transmittable per unit time). The serialization delay time varies along with the variation of the transmission capacity.

In mobile terminals, when the communication condition is likely to become worse due to factors such as moving, a communication system being used is often switched to another communication system of a different communication scheme in order to continue the communication with, for example, the distribution source of contents. For example, a mobile terminal switches from an LTE system, which is one of the communication schemes, to a 3G (3rd Generation) system, which is another one of the communication schemes. Incidentally, 3G is a communication scheme for digital mobile phones that complies with the standards defined by ITU (International Telecommunication Union).

When a communication system being used by a mobile terminal is switched to a communication system of a different communication scheme as described above, a handover process is carried out in the mobile terminal and the communication systems used by the mobile terminal. Such the handover between the communication systems different from each other is called as a vertical handover. Processing relating to the vertical handover causes variation in the information transmission delay time, transmission capacity and the like in a communication path, and due to such variation, propagation delay and serializing delay (hereinafter called as propagation delay or the like) frequently vary.

By the way, in TCP (Transmission Control Protocol), which has been widely used in both wired and wireless data communications, techniques relating to congestion control are advanced in order to adapt to the recent communication environments where a lot of traffics coexist.

As the techniques relating thereto, there are delay-based TCPs, represented by TCP Vegas disclosed in NPL 1 and FAST TCP disclosed in NPL 2. In the delay-based TCPs, for example, a server device that performs communication control detects data (information) congestion in a network by estimating the amount of queue remaining in the network. When detecting the congestion, the server device then suppresses a data (information) transmission rate before occurrence of packet loss. In this way, the server device makes it possible to stabilize throughput without network corruption. More specifically, in the delay-based TCPs, the server device estimates the amount of queue remaining in the network based on the product of the available bandwidth (available transmission capacity) or transmission rate and the queuing delay. When the estimated amount of queue exceeds a threshold value, the server device then makes a detection of congestion and controls the transmission rate in a decreasing direction of the data transmission rate.

Queuing delay refers to a time obtained by subtracting the propagation delay or the like from the current delay (a time from transmission of information (data) to arrival at a destination or a round trip time from transmission of information to receipt by an information originator of reply information by the destination having received the information). In TCPs, the propagation delay or the like is estimated by a minimum value of delay dmin measured in data (information) communication, and the minimum value dmin is stored as a value of the propagation delay or the like in, for example, a storage device of the server device. When a minimum value of delay dmin smaller than the estimated value dmin is measured, the value of the propagation delay or the like is generally updated to the newly measured minimum value dmin. In this case, however, the value of the propagation delay or the like is updated only when a smaller delay (minimum value dmin) is measured, and therefore, there is a problem that if the propagation delay or the like increases, the increase is not reflected in the value of the propagation delay or the like when the propagation delay or the like increases.

In other words, the increase in the propagation delay or the like results in the discrepancy between the actual propagation delay or the like and the propagation delay or the like that the server device recognizes. The discrepancy in the propagation delay or the like also causes a discrepancy in the estimated value of the queuing delay, and as a result, the server device estimates a queue amount that is larger than the actual queue amount by using the queuing delay. Consequently, the server device erroneously recognizes that the network is congested based on the erroneous queue amount and unnecessarily reduces the transmission rate in the delay-based TCPs. This will cause an inconvenience that throughput in TCPs decreases.

Meanwhile, a solution for the problem is proposed in NPL 3. In the approach proposed in NPL 3, a server device checks whether the propagation delay or the like has increased for each constant interval (each fixed number of packets, in the example described in NPL 3) and, resets the value dmin of the propagation delay or the like, when an the propagation delay or the like has increased. Specifically, the server device computes the minimum value of delay for each N (N is an integer equal to or greater than 2) acknowledgements (ACK (ACKnowledge)) as dmin_est. When the value obtained by subtracting the value dmin set as the propagation delay or the like from the computed value dmin_est (dmin_est−dmin) is greater than the queuing delay L (L is an integer equal to or greater than 2) consecutive times, the server device then judges that the propagation delay or the like has increased. According to such determination, the server device resets the value dmin of the propagation delay or the like to the minimum value dmin_est of the latest delay. Accordingly, the server device is able to recognize the increase in the propagation delay or the like within a fixed number of packets (L×N packets).

CITATION LIST

Non Patent Literature

[NPL1] L. S. Brakmo, S. W. O'Malley, and L. L. Peterson, "TCP Vegas: New Techniques for Congestion Detection and Avoidance", In Proc. of ACM SIGCOMM 1994, pp. 24-35, London, UK, August 1994

[NPL2] C. Jin, D. X. Wei, and S. H. Low, "FAST TCP: Motivation, Architecture, Algorithms, Performance", In Proc. of IEEE INFOCOM 2004, Vol. 4, pp. 2490-2501, Hong Kong, China, March 2004

[NPL3] J. Mo, R. J. La, V. Anantharam, and J. Walrand, "Analysis and Comparison of TCP Reno and Vegas", In Proc. of IEEE INFOCOM 1999, Vol. 3, pp. 1556-1563, USA, March 1999

SUMMARY OF INVENTION

Technical Problem

However, the approach in NPL 3 has a problem that it is difficult to set an appropriate interval for computing the minimum value dmin_est of the propagation delay or the like. In other words, there is a disadvantage that increasing the fixed interval for computing the minimum value dmin_est will extend time for reflecting the increase of propagation delay or the like to the value dmin of the propagation delay or the like when the propagation delay or the like increases. In contrast, reducing the fixed interval for computing the minimum value dmin_est will often lead to the increase in the value dmin of the propagation delay or the like, even when the propagation delay or the like does not show a large change. This will cause an inconvenience that the server device underestimates the queuing delay and excessive traffic flows in the network. In addition, the communication condition of the mobile terminals or network varies from moment to moment depending on, for example, changes in surrounding conditions due to moving of the mobile terminals, changes in radio wave conditions between the mobile terminals and the base station, and changes in cross traffic conditions. A fixed constant interval for computing the minimum value dmin_est regardless of such a dynamic variation in the communication condition will impose a limitation on the optimization of the network communication state.

The present invention was made in order to solve the problems as described above. In other words, the main objective of the present invention is to provide a technique capable of appropriately detecting propagation delay or the like (minimum delay value) in order to appropriately control a transmission rate of information in information communications.

Solution to Problem

To achieve the objective of the present invention, a minimum delay value calculating device of the present invention includes:

a minimum value setting unit that updates a minimum delay value to a measured value of delay that is a time from transmission of information to arrival at a destination of the information or a round trip time from transmission of information to receipt of reply information from a destination receiving the information by an information originator, upon input of the measured value of delay if the measured value of delay is smaller than a value set as the minimum delay value;

a timing determination unit that determines a review timing for reviewing the minimum delay value based on the measured value of delay; and a minimum value review unit that updates the minimum delay value to a newly minimum delay value calculated using the measured value of delay or updating the minimum delay value to a preset initial value at the review timing determined by the timing determination unit.

An information transmitting device of the present invention includes:

the minimum delay value calculating device of the present invention; and a transmitting unit that transmits information at a transmission rate calculated based on the minimum delay value set by the minimum delay value calculating device.

A minimum delay value calculating method of the present invention includes:

updating a minimum delay value to a measured value of delay that is a time from transmission of information to arrival at a destination of the information or a round trip time from transmission of information to receipt of reply information from a destination receiving the information by an information originator, upon input of the measured value of delay if the measured value of delay is smaller than a value set as the minimum delay value;

determining a review timing for reviewing the minimum delay value based on the measured value of delay; and updating the minimum delay value to a newly minimum delay value calculated using the measured value of delay or updating the minimum delay value to a preset initial value at the review timing.

A storage medium of the present invention storing a computer program that causes a computer to execute:

processing for updating a minimum delay value to a measured value of delay that is a time from transmission of information to arrival at a destination of the information or a round trip time from transmission of information to receipt of reply information from a destination receiving the information by an information originator, upon input of the measured value of delay if the measured value of delay is smaller than a value set as the minimum delay value;

processing for determining a review timing for reviewing the minimum delay value based on the measured value of delay; and processing for updating the minimum delay value to a newly minimum delay value calculated using the measured value of delay or updating the minimum delay value to a preset initial value at the review timing.

The objective of the present invention is also achieved by the minimum delay value calculating method of the present invention related to the minimum delay value calculating device of the configuration as described above. In addition, the objective is also achieved by the computer program that causes a computer to implement the minimum delay value calculating device and the minimum delay value calculating method of the present invention, and by the program storage medium that stores the computer program.

Advantageous Effects of Invention

The present invention enables appropriate detection of propagation delay or the like (minimum delay value) in order to appropriately control a transmission rate of information in information communications.

DESCRIPTION OF EMBODIMENTS

Exemplary embodiments of the present invention will be described below with reference to the accompanying drawings.

<First Exemplary Embodiment>

Figure 1:
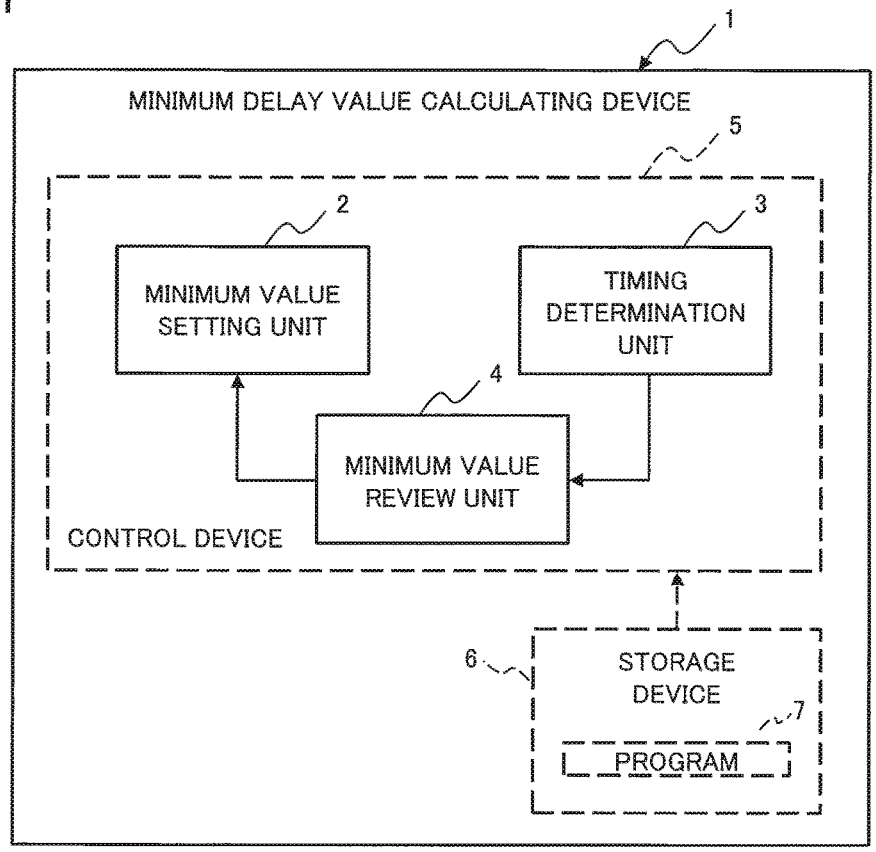
FIG. 1 is a block diagram illustrating a simplified configuration of a minimum delay value calculating device of a first exemplary embodiment according to the present invention.

FIG. 1 is a block diagram illustrating a simplified configuration of a minimum delay value calculating device of a first exemplary embodiment according to the present invention. A minimum delay value calculating device 1 of the first exemplary embodiment includes a minimum value setting unit 2, a timing determination unit 3 and a minimum value review unit 4. In the first exemplary embodiment, the minimum delay value calculating device 1 is configured to receive input of a measured value of delay, which is measured, from the outside of the device 1. The term "delay" herein refers to a time from transmission of information to arrival at a destination of the information or a round trip time from transmission of information to receipt by an information originator of reply information from the destination having received the information.

The minimum value setting unit 2 includes a function of, when a measured value of delay (hereinafter also referred to as a measured delay value) is input and the measured delay value is smaller than a value set as a minimum delay value, updating the minimum delay value to the measured delay value. In other words, the minimum value setting unit 2 includes a function of setting the measured delay value as a new minimum delay value, when the measured delay value is smaller than the set minimum delay value.

The timing determination unit 3 includes a function of determining (detecting) a review timing for reviewing the set minimum delay value based on the measured delay value.

The minimum value review unit 4 includes a function of updating the set minimum delay value at the determined review timing. The minimum delay value to be updated is a value calculated using the measured delay value or a preset initial value. After the minimum delay value is updated by the minimum value review unit 4, the minimum value setting unit 2 sets the minimum delay value as described above using the updated minimum delay value.

The minimum value setting unit 2, the timing determination unit 3, and the minimum value review unit 4 are implemented by, for example, a control device (e.g., CPU (Central Processing Unit)) 5. In other words, the minimum delay value calculating device 1 of the first exemplary embodiment includes, for example, the control device 5 and a storage device (storage medium) 6. In the storage device 6, a computer program (program) 7 that indicates a control procedure (processing procedure) for controlling the overall operation of the minimum delay value calculating device 1 is stored. The control device 5 executes the program 7 read out from the storage device 6, thereby implementing each function of the minimum value setting unit 2, the timing determination unit 3, and the minimum value review unit 4.

The minimum delay value calculating device 1 of the first exemplary embodiment includes a function of determining review timing for reviewing the minimum delay value by means of the timing determination unit 3 based on the measured delay value. In other words, the minimum delay value calculating device 1 includes a function of changing the review timing for the minimum delay value in response to delay variation. Thus, the minimum delay value calculating device 1 makes it possible to review the minimum delay value at an appropriate timing taking account of the delay variation, and to calculate the minimum delay value suitable for the communication condition.

Figure 2:
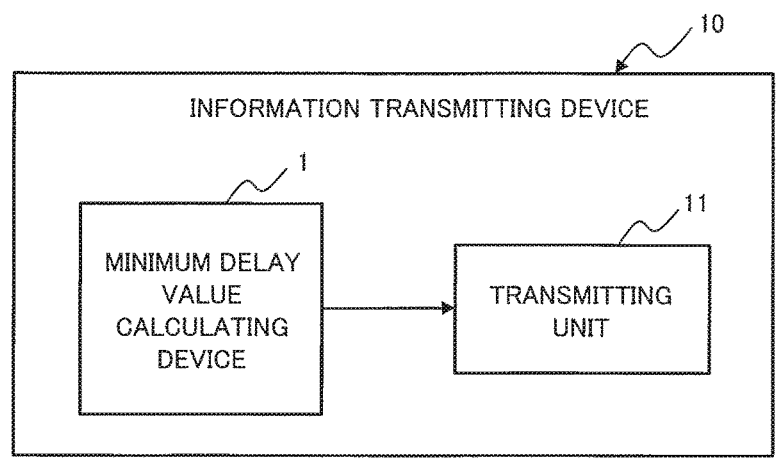
FIG. 2 is a block diagram illustrating an exemplary embodiment of an information transmitting device according to the present invention.

FIG. 2 is a block diagram illustrating a simplified configuration of an exemplary embodiment of an information transmitting device according to the present invention. An information transmitting device 10 of the exemplary embodiment includes the minimum delay value calculating device 1 as described above and a transmitting unit 11. The transmitting unit 11 includes a function of calculating a transmission rate based on the minimum delay value calculated by the minimum delay value calculating device 1, and transmitting information at the calculated transmission rate.

The information transmitting device 10 transmits information at the transmission rate calculated based on the minimum delay value (i.e., the minimum delay value suitable for the communication condition) calculated by the minimum delay value calculating device 1. Thus, the information transmitting device 10 makes it possible to control the transmission rate following rapidly and accurately the changes in the communication condition. Consequently, the information transmitting device 10 can greatly contribute to the improvement of throughput in information transmission.

<Second Exemplary Embodiment>

A second exemplary embodiment according to the present invention will be described below.

Figure 3:
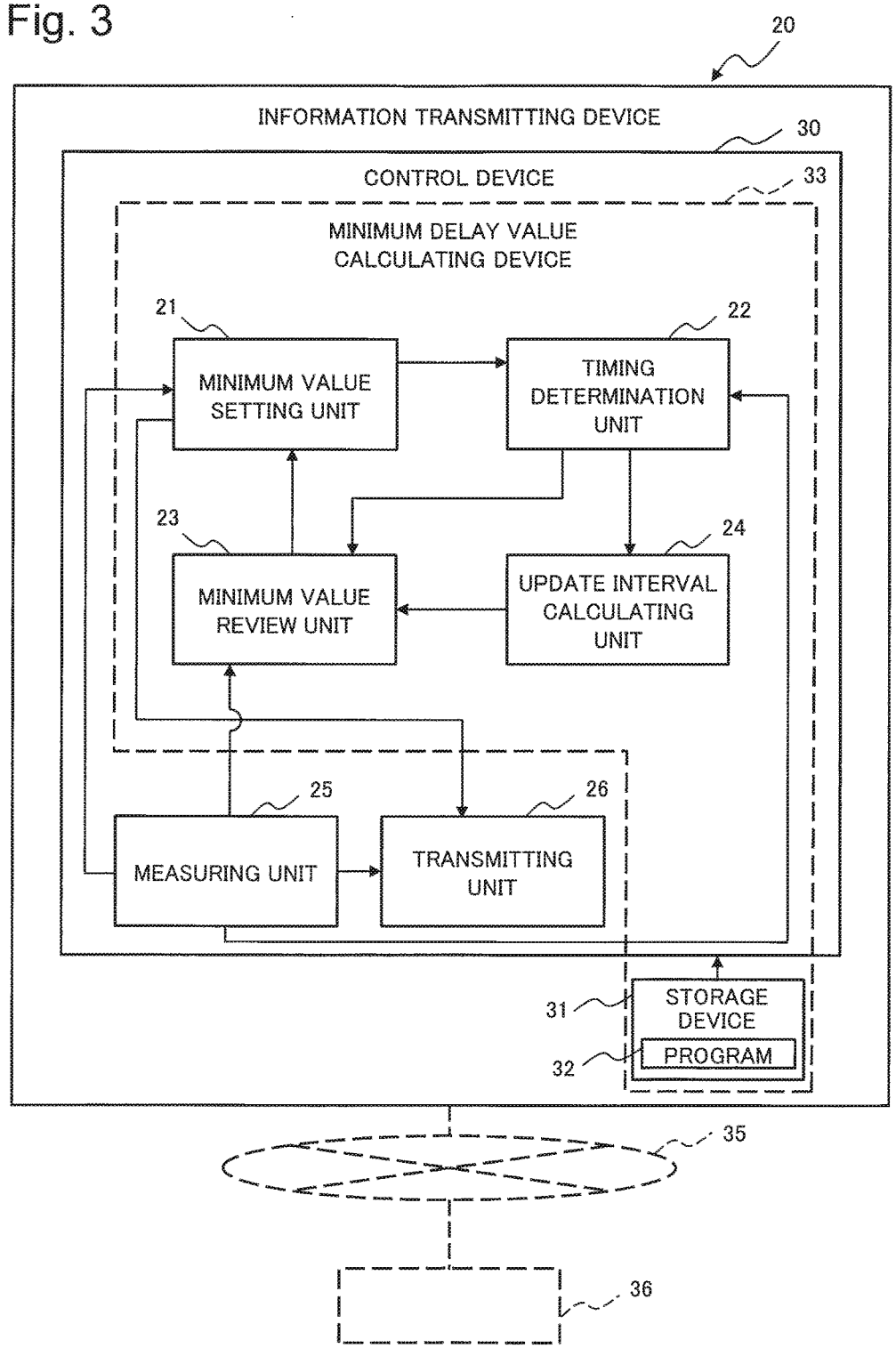
FIG. 3 is a block diagram illustrating a simplified configuration of an information transmitting device including a minimum delay value calculating device of a second exemplary embodiment according to the present invention.

FIG. 3 is a block diagram illustrating a simplified configuration of an information transmitting device including a minimum delay value calculating device of the second exemplary embodiment according to the present invention. An information transmitting device 20 of the second exemplary embodiment is connected via an information communication network 35 such as the Internet to a user's device with communication function (hereinafter referred to as a user terminal) 36 serving as an information supply destination. The information transmitting device 20 is a device including a function of transmitting (replying) information (data) requested by the user terminal 36 to the user terminal 36 via the information communication network 35. Specific examples of the information transmitting device 20 include an origin server. Alternatively, information transmitting device 20 may be an information relay device (specifically, e.g., a cache server, a proxy server, and an edge server) that is interposed on the communication path between the origin server and the user terminal 36 and temporarily terminates information communication. Alternatively, the information transmitting device 20 may be communication equipment (e.g., P-GW (Packet Data Network Gateway) and S-GW (Serving Gateway)) that constitutes an information communication system. When the information transmitting device 20 is interposed on the communication path between the origin server and the user terminal 36, the information communication network connecting between the information transmitting device 20 and the user terminal 36 may be different from the information communication network connecting between the information transmitting device 20 and the origin server.

Hardware configurations in the information transmitting device 20 include a control device 30 and a storage device (storage medium) 31. The storage device 31 is, for example, a hard disk device. The storage device 31 stores a computer program (hereinafter also abbreviated as a program) 32 for controlling operations of the information transmitting device 20 and various data therein. The control device 30 includes a CPU (not illustrated) and may have functions as are described below by CPU that executes the program 32 read out from the storage device 31. In other words, in the second exemplary embodiment, the control device 30 includes, as functional units, a minimum value setting unit 21, a timing determination unit 22, a minimum value review unit 23, an update interval calculating unit 24, a measuring unit 25, and a transmitting unit 26. In the second exemplary embodiment, a minimum delay value calculating device 33 is constituted by the minimum value setting unit 21, the timing determination unit 22, the minimum value review unit 23, the update interval calculating unit 24, and the storage device 31 (program 32), which are implemented by the CPU.

The measuring unit 25 has a function of measuring delay of information communication in the information communication network 35. The term "delay" herein refers to a round trip time of information from transmission of information (data packet) by the information transmitting device 20 toward the user terminal 36 as a destination to receipt of an ACK (ACKnowledge) packet as reply information from the user terminal 36 having received the information by the information transmitting device 20. Such delay being the round trip time of information (round-trip delay) is sometimes called as a RTT (Round Trip Time). There may be also a case where the delay is defined by a time from transmission of information (data packet) by the information transmitting device 20 to receipt of the information by the user terminal 36 as a destination (also referred to as one-way delay). The delay measured by the measuring unit 25 may be the round-trip delay as described above or the one-way delay, which may be determined as appropriate.

In the second exemplary embodiment, the measuring unit 25 measures the delay either at a time when the information transmitting device 20 receives the ACK packet corresponding to a data packet transmitted by the information transmitting device 20 or at each preset timing, in the following manner. For example, the information transmitting device 20 (measuring unit 25) transmits a packet (search packet) different from the data packet and measures the delay using the propagation time of the search packet. There is a variety of ways to measure delay and the information transmitting device 20 (measuring unit 25) may measure delay by a measuring method other than the measurement by use of the search packet, but the descriptions thereof are omitted herein.

The measuring unit 25 further includes a function of holding a measured value of delay (hereinafter also referred to as a measured delay value dm) obtained by measurement for a predetermined period (e.g., a set time period or a period for which a set number of packets are transmitted). Further, the measuring unit 25 includes a function of outputting the measured delay value dm to the minimum value setting unit 21, each time the measured delay value dm is measured. The timing at which the measuring unit 25 outputs the measured delay value dm to the minimum value setting unit 21 is not limited to each time the measured delay value dm is measured, but may also be, for example, each predetermined number of times of measurement.

The minimum value setting unit 21 includes a function of holding a value set as a minimum delay value (the set minimum delay value is hereinafter referred to as a minimum delay value dmin also). Further, the minimum value setting unit 21 includes a function of comparing the measured delay value dm with the minimum delay value dmin, each time the measured delay value dm measured by the measuring unit 25 is input. Still further, the minimum value setting unit 21 includes a function of updating the held minimum delay value dmin to the measured delay value dm (in other words, resetting the value of the minimum delay value dmin to the value of the measured delay value dm), when the measured delay value dm is equal to or less than the minimum delay value dmin.

The timing determination unit 22 includes a function of determining a review timing for reviewing the minimum delay value dmin held by the minimum value setting unit 21. In other words, the timing determination unit 22 determines whether the measured delay value dm is the minimum delay value dmin held by the minimum value setting unit 21 or a value close thereto, each time the measuring unit 25 measures the measured delay value dm. The timing determination unit 22 makes a determination of a review timing (in the communication condition so as to review the minimum delay value dmin), when the measured delay value dm is determined to be the minimum delay value dmin or a value close thereto.

To give a specific example, the timing determination unit 22 determines that the measured delay value dm is a value close to the minimum delay value dmin (including the case where the measured delay value dm is the minimum delay value dmin (dm=dmin)), when the measured delay value dm satisfies Equation (1).

$$dm \leq e \times d\min \tag{1}$$

Where, "e" in Equation (1) represents a preset constant greater than 1. The constant "e", which is a numerical value set as appropriate taking account of a communication schemes or the like used by the information transmitting device 20 and is not to be limited as long as it is a numerical value greater than 1. The constant "e" is set to, for example, a numerical value within the range of greater than 1 and equal to or less than 1.5 or 2.

Alternatively, the timing determination unit 22 may determine that the measured delay value dm is a value close to the minimum delay value dmin in a case as follows. For example, the timing determination unit 22 calculates either a variation width h or a standard deviation s with respect to a plurality of values that have been set as the minimum delay value dmin within a predetermined period M. The term "period M" refers to, for example, a period from a point in time of starting communication in execution to a point in time of calculating the variation width h or standard deviation s. Alternatively, the period M may be a period between a point in time of calculating the variation width h or standard deviation s and a point in time back to a predetermined timing.

The timing determination unit 22 then determines that the measured delay value dm is a value close to the minimum delay value dmin, when the measured delay value dm satisfies Equation (2) using the variation width h or Equation (3) using the standard deviation s.

$$dm \leq dmin + (f \times h) \quad (2)$$

$$dm \leq dmin + (g \times s) \quad (3)$$

Where, "f" in Equation (2) represents a preset constant greater than 0. "g" in Equation (3) represents a preset constant greater than 0. The constant "f" in Equation (2) and the constant "g" in Equation (3) are set as appropriate as long as they are numerical values greater than 0, and the numerical values of the constants "g" and "f" are not to be limited. However, since the variation width h and the standard deviation s are numerical values representing variations of the minimum delay value dmin, the measured delay value dm is determined to be close to the minimum delay value dmin, when the measured delay value dm is smaller than the variations, and the constant "f" is set as appropriate to a numerical value within the range of greater than 0 to smaller than 0.5, for example. Additionally, the constant "g" is set as appropriate to a numerical value within the range of greater than 0 to smaller than 1.0.

The timing determination unit 22 determines the review timing for reviewing the minimum delay value dmin, when the measured delay value dm is determined to be a value close to the minimum delay value dmin by the method as described above. Further, the timing determination unit 22 includes a function of holding information (e.g., time information) representing the determined review timing.

The update interval calculating unit 24 includes a function of calculating an update interval (hereinafter also expressed as an update interval INTupdate) used in processing for reviewing the minimum delay value dmin, when the timing determination unit 22 determines the review timing. For example, when the timing determination unit 22 determines the review timing, the update interval calculating unit 24 takes in information as to the determined review timing and the latest review timing from the timing determination unit 22. The update interval calculating unit 24 then calculates an interval between the review timings (hereinafter expressed as an interval INT_m). The interval INT_m may be represented by time or may be represented by the number of packets.

The update interval calculating unit 24 calculates the update interval INTupdate, based on the calculated interval INT_m, as follows. For example, the update interval calculating unit 24 calculates a value by constant multiplication of the interval INT_m as the update interval INTupdate. Alternatively, the update interval calculating unit 24 calculates an average value of a plurality of intervals INT_m calculated during a predetermined period, and calculates a value obtained by constant multiplication of the average value as the update interval INTupdate. Alternatively, the update interval calculating unit 24 calculates a value obtained by multiplying a value taking an exponential moving average of the calculated intervals INT_m with a constant as the update interval INTupdate. A numerical value for the constant multiplication as described above is set as appropriate taking account of a communication schemes or the like, and is not limited.

Alternatively, the update interval calculating unit 24 computes a histogram of the plurality of intervals INT_m calculated during the predetermined period, approximates the histogram to a probability distribution function, and calculates an average μ and a standard deviation σ of the approximated probability distribution function. The update interval calculating unit 24 then calculates the update interval INTupdate by using Equation (4). "k" in Equation (4) represents a preset constant.

$$INTupdate = \mu + k \times \sigma \quad (4)$$

Alternatively, the update interval calculating unit 24 models a communication path for information by a queue, calculates a utilization rate ρ of the queue based on the interval INT_m, and calculates the update interval INTupdate based on a current transmission rate and the utilization rate ρ.

The minimum value review unit 23 includes a function of reviewing the minimum delay value dmin, when the timing determination unit 22 determines the review timing. For example, each time the review timing is determined, the minimum value review unit 23 acquires, from the measuring unit 25, the plurality of the measured delay values dm measured during a period H between a point in time of determining the review timing and a point in time back by the time of the update interval INTupdate. The minimum value review unit 23 then detects a minimum value dm_min among the plurality of the measured delay values dm during the period H and calculates the minimum value dm_min as a minimum delay value dmin_k.

Alternatively, the minimum value review unit 23 may calculate the minimum delay value dmin_k as follows. For example, the minimum value review unit 23 calculates the minimum delay value dmin_k based on Equation (5) using the minimum delay value dmin held by the minimum value setting unit 21 and a preset smoothing factor α. In other words, the minimum value review unit 23 calculates a value obtained by taking an exponential moving average of the minimum values dm_min among the measured delay values dm in each the period H based on the update interval INTupdate as the minimum delay value dmin_k.

$$dmin\_k = \alpha \times dm\_min + (1-\alpha) \times dmin \quad (5)$$

Any method other than the above may be employed as the method for calculating the minimum delay value dmin_k by the minimum value review unit 23. For example, each time the review timing is determined, the minimum value review unit 23 may calculate a predetermined initial value as the minimum delay value dmin_k. Thus, there are various methods for calculating the minimum delay value dmin_k, and an appropriate method may be employed here to calculate the minimum delay value dmin_k.

In addition, when calculating the minimum delay value dmin_k as described above, the minimum value review unit 23 updates the minimum delay value dmin held by the minimum value setting unit 21 to the minimum delay value dmin_k thus calculated.

In this manner, after the minimum delay value dmin is updated by the minimum value review unit 23, the minimum value setting unit 21 sets (updates) the minimum delay value dmin based on the minimum delay value dmin thus updated.

The transmitting unit 26 includes a function of transmitting data while controlling a transmission rate of the data to be transmitted to the user terminal 36. For example, the transmitting unit 26 includes a function of controlling (changing) the transmission rate each time the measuring unit 25 measures delay dm, or for each predetermined time interval or for each predetermined number of packets. The transmitting unit 26 herein controls the transmission rate using the measured delay value dm measured by the measuring unit 25, the minimum delay value dmin held by the minimum value setting unit 21, and the current transmission rate. More specifically, for example, the transmitting unit 26 determines that the information communication network 35 is congested in the event of packet loss, in the same manner as a communication control method that is proposed as TCP Westwood+. The transmitting unit 26 then calculates the product of an estimated value of the current throughput of the congested information communication network 35 and the minimum delay value dmin, and controls the transmission rate so as to be the value of the product.

Alternatively, the transmitting unit 26 calculates the queuing delay based on a difference between the measured delay value dm and the minimum delay value dmin, in the same manner as a communication control method that is proposed as TCP Vegas. The transmitting unit 26 then estimates the queue amount in the communication path from the information transmitting device 20 to the user terminal 36 via the information communication network 35 based on the product of the available bandwidth or current transmission rate and the queuing delay. Further, the transmitting unit 26 determines that the information communication network 35 is congested when the queue amount exceeds a set threshold value, and reduces the transmission rate by a predetermined adjustment rate. In this manner, the transmitting unit 26 may control the transmission rate. The transmitting unit 26 may control the transmission rate with any method other than the above.

When the information transmitting device 20 of the second exemplary embodiment is an origin server, original information (original data) to be transmitted is held in the storage device that is built in or externally connected to the information transmitting device 20. Therefore, the information transmitting device 20 is able to transmit the original data toward the user terminal 36 at the transmission rate controlled by the transmitting unit 26. In addition, when the information transmitting device 20 is a relay server device or communication equipment that constitutes a communication system (e.g., P-GW and S-GW), the information transmitting device 20 caches information received from outside to be transmitted (relayed) in its own storage device and temporarily holds a data stream as a buffer. Consequently, the information transmitting device 20 (relay server device or the above communication equipment) is able to transmit the information to be transmitted (relayed) at the transmission rate controlled by the transmitting unit 26, without being influenced by the throughput with the origin server.

When the information transmitting device 20 is the relay server device or the communication equipment as previously mentioned, there are some cases where the information transmitting device 20 transmits information (data) to the user terminal 36 in place of the origin server. In this case, it is necessary for the information transmitting device 20 to acquire a data request message transmitted from the user terminal 36 toward the origin server. As a method for acquiring the request message, for example, the information transmitting device 20 is connected to a router that is interposed on the communication path connecting between the user terminal 36 and the origin server. The router is allowed to transfer the request message addressed to the origin server to the information transmitting device 20 based on header information of the request message.

The user terminal 36 may be allowed to transmit a request message explicitly designating the information transmitting device 20 as a proxy server. Further, when the user terminal 36 uses a DNS (Domain Name System) or the like to acquire an address of the destination in order to transmit a request message to the origin server, the request message may be acquired as follows. In other words, the DNS (Domain Name System) or the like is caused to reply the address of the information transmitting device 20 instead of the address of the origin server. Consequently, the information transmitting device 20 is able to acquire the request message of the user terminal 36 in place of the origin server.

Figure 4:
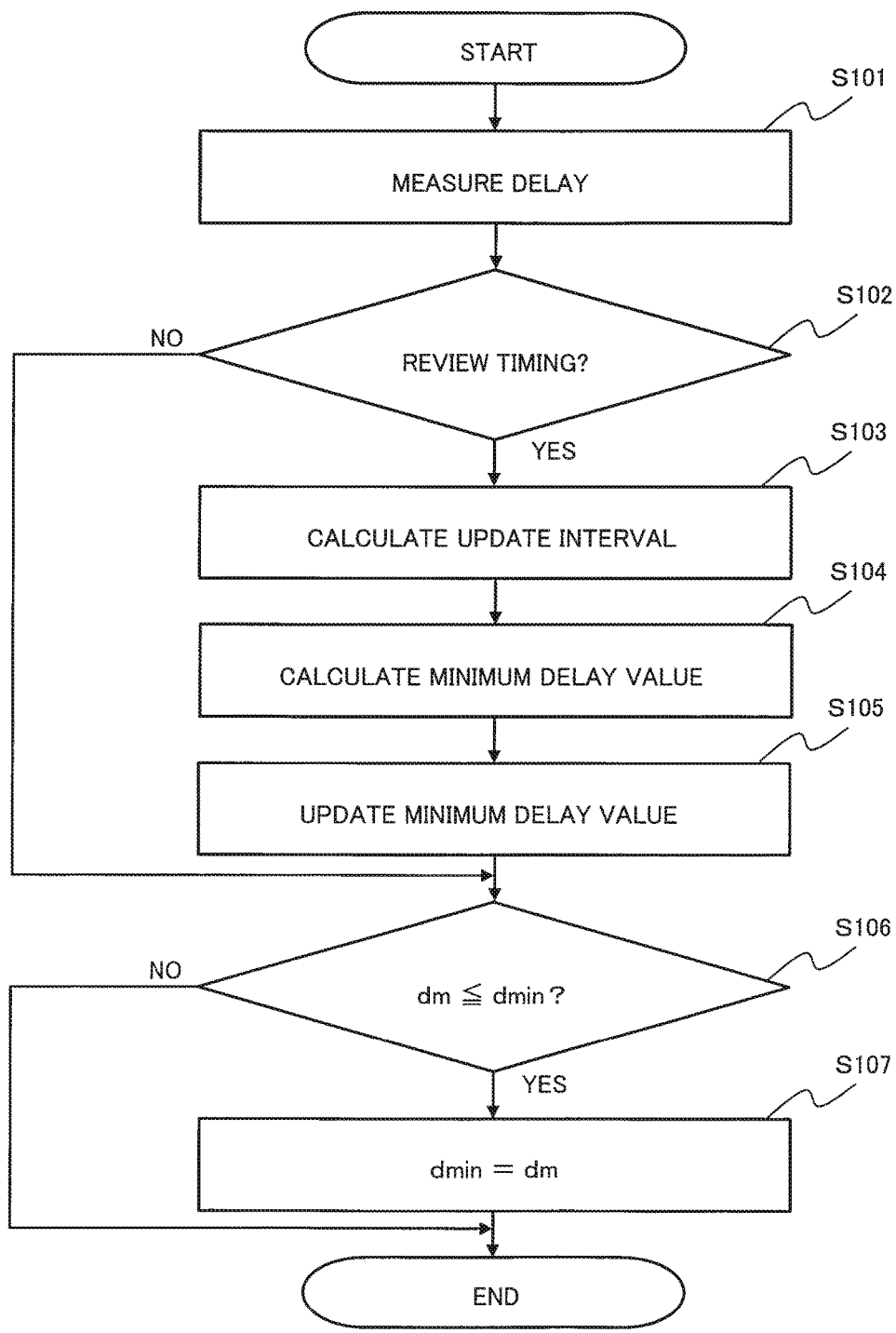
FIG. 4 is a flowchart illustrating an example of operations relating to reviewing and setting of a minimum delay value in the second exemplary embodiment.

An example of operations relating to reviewing and setting of a minimum delay value in the information transmitting device 20 is described below with reference to FIG. 4. The flowchart in FIG. 4 illustrates a processing procedure executed by the control device 30 (CPU).

For example, when the measuring unit 25 of the control device 30 measures delay (step S101), the timing determination unit 22 determines whether a review timing for reviewing a minimum delay value dmin as previously described (step S102). When the timing determination unit 22 determines the review timing, the update interval calculating unit 24 then calculates an update interval INTupdate (step S103). Thereafter, the minimum value review unit 23 calculates a minimum delay value dmin_k using the update interval INTupdate and the measured value of delay (measured delay value dm) (step S104). The minimum value review unit 23 then updates (sets) the minimum delay value dmin set in the minimum value setting unit 21 to the calculated minimum delay value dmin_k (step S105).

Thereafter, the minimum value setting unit 21 determines whether the measured value of delay (measured delay value dm) is equal to or less than the set minimum delay value dmin (step S106). When the timing determination unit 22 determines that it is not review timing in the determination operation at step S102, the operations at steps S103 to S105 are not executed but the operation by the minimum value setting unit 21 at step S106 is initiated.

When the measured delay value dm is equal to or less than the minimum delay value dmin, the minimum value setting unit 21 updates (sets) the minimum delay value dmin to the measured delay value dm (step S107).

As described above, the control device 30 executes the operations relating to reviewing and setting of the minimum delay value dmin.

The information transmitting device 20 of the second exemplary embodiment is able to review the minimum delay value dmin in an increasing direction when the delay changes in an increasing direction, and to review the minimum delay value dmin, in contrast, in a decreasing direction when the delay changes in a decreasing direction. In other words, the information transmitting device 20 is able to review the minimum delay value dmin depending on the communication condition.

Further, since timing for reviewing the minimum delay value dmin can be changed depending on the communication condition, the information transmitting device 20 is able to review the minimum delay value dmin at an appropriate timing suitable for the communication condition.

Additionally, the information transmitting device 20 includes a function of varying the width of the update interval INTupdate used when reviewing the minimum delay value dmin (i.e., the range for selecting the measured delay value dm used when calculating the minimum delay value dmin) depending on the communication condition. Consequently, the information transmitting device 20 is able to calculate the minimum delay value dmin taking account of the speed of change in the communication condition.

In this way, since the minimum delay value suitable for the communication condition can be set, the information transmitting device 20 makes it possible to accurately control a transmission rate using the minimum delay value. Thus, the information transmitting device 20 makes it easy to improve the throughput in the information communication.

<Other Exemplary Embodiments>

The present invention is not limited to the first and second exemplary embodiments but may employ various exemplary embodiments. For example, in the second exemplary embodiment, an example in which a communication protocol used when transmitting information is TCP is described, but the present invention is applicable to a device or the like that communicates information using a communication protocol such as UDP (User Datagram Protocol), for example, other than TCP.

Figure 5:
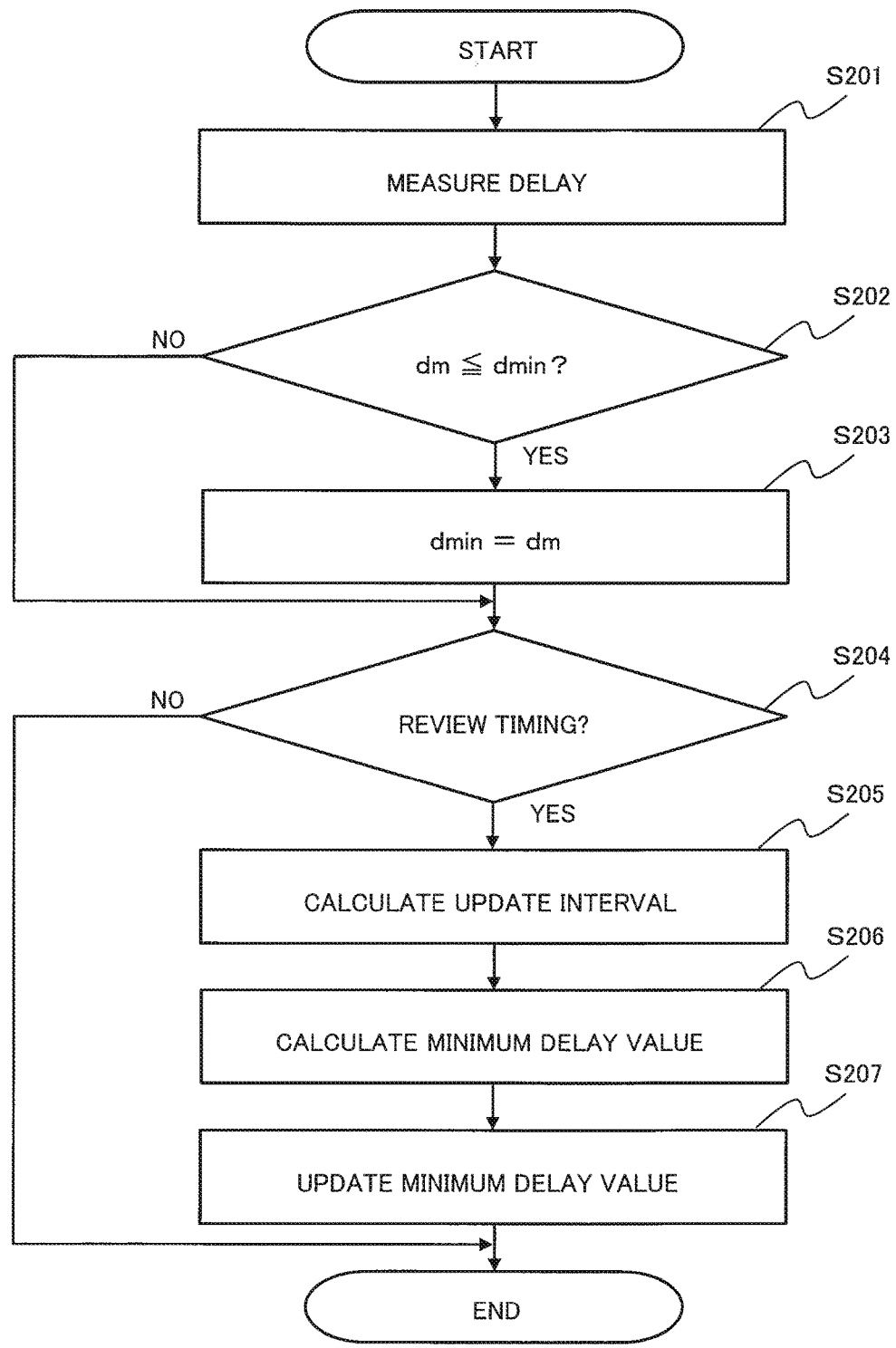
FIG. 5 is a flowchart illustrating another example of operations relating to reviewing and setting of a minimum delay value in the second exemplary embodiment.

Further, in the second exemplary embodiment, the operations (processing) relating to setting of the minimum delay value at steps S106 and S107 are executed after the operations (processing) relating to reviewing of the minimum delay value at steps S102 to S105, as illustrated in FIG. 4. In contrast, the operations relating to setting of the minimum delay value (steps S202 and S203) may be executed before the operations relating to reviewing of the minimum delay value (steps S204 to S207), as illustrated in FIG. 5.

In addition, in the second exemplary embodiment, the determination as to the review timing or not is made each time the delay is measured, but the determination as to the review timing or not may be made each time a preset number of times of delay are measured.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-268402, filed on Dec. 26, 2013, the disclosure of which is incorporated herein in its entirety by reference.

REFERENCE SIGNS LIST

1, 33 Minimum delay value calculating device
2, 21 Minimum value setting unit
3, 22 Timing determination unit
4, 23 Minimum value review unit
6, 31 Storage device
24 Update interval calculating unit
25 Measuring unit
26 Transmitting unit

What is claimed is:

1. A minimum delay value calculating device comprising:
a non-transitory computer-readable medium storing code;
a processor that, by executing the code, is configured to:
measure (i) a time from transmission of information, which is transmitted from the own device (the minimum delay value calculating device) or an external device which is transmitting data, to arrival at a destination of the information as a delay or (ii) a round trip time from the transmission of the information to receipt of reply information, which is received by the own device or the external device, from the destination receiving the information as the delay;
when the measured delay is smaller than a value which is already set in the own device as a minimum delay value, set the measured delay as the minimum delay value instead of the already set value;
determine a review timing of the set minimum delay value using a time period between a first timing when the measured delay is close to the minimum delay value, which is already set at the first timing as the latest review timing, and a second timing when the measured delay is close to the minimum delay value, which is set at the second timing after the latest review timing; and
update the minimum delay value, at the determined review timing, to a predetermined preset initial value, or calculate the minimum delay value using the measured delay and update the minimum delay value, at the determined review timing, to the calculated minimum delay value.

2. The minimum delay value calculating device according to claim 1, wherein when calculating the minimum delay value, the processor calculates a minimum value among the measured values of delay measured in the period of the update interval as the minimum delay value, or alternatively, calculates a value obtained by taking an exponential moving average of the minimum values each among the measured values of delay measured in the period of the update interval as the minimum delay value.

3. The minimum delay value calculating device according to claim 1, wherein, when assuming that the interval between the review timing set and a latest review timing close to that review timing is $INT\_m$ and the update interval is INTupdate, the processor calculates the update interval based on a mathematical expression of $INTupdate=INT\_m \times a$ (where a is a constant greater than 1); alternatively, calculates the update interval based on a mathematical expression of $INTupdate=A \times b$ (where b is a constant greater than 1) when assuming that an average value of the plurality of intervals $INT\_m$ obtained in a predetermined period is A; alternatively, calculates the update interval based on a mathematical expression of $INTupdate=B \times c$ (where c is a constant greater than 1) when assuming that a value obtained by taking an exponential moving average of the intervals $INT\_m$ is B; alternatively, calculates the update interval based on a mathematical expression of $INTupdate=\mu+k \times \sigma$ (where k is a constant) when assuming that an average value of a probability distribution function obtained by approximating a histogram of the plurality of intervals $INT\_m$ in the predetermined period is $\mu$, and a standard deviation of the probability distribution function is $\sigma$; or alternatively, calculates the update interval based on a transmission rate of the information and a utilization rate in an information queue in a communication path for the information, the utilization rate being calculated using the interval $INT\_m$.

4. The minimum delay value calculating device according to claim 1, wherein, when assuming that the measured value of delay is dm, the minimum delay value is dmin, a variation width of a plurality of values of delay that have been set as the minimum delay value is h, and a statistical standard deviation of the plurality of values of delay that have been set as the minimum delay value is s,
the processor determines the review timing if a predetermined condition is satisfied among a condition that the measured value of delay dm satisfies a mathematical expression of $dm \leq e \times dmin$ (where e is a constant greater than 1), a condition that the measured value of delay dm satisfies a mathematical expression of $dm \leq dmin+(f \times h)$ (where f is a constant greater than 0), and a condition that the measured value of delay dm satisfies a mathematical expression of $dm \leq dmin +(g \times s)$ (where g is a constant greater than 0).

5. An information transmitting device comprising:
the minimum delay value calculating device according to claim 1; and
a transmitter that transmits information at a transmission rate calculated based on the minimum delay value set by the minimum delay value calculating device.

6. A minimum delay value calculating method comprising:
by processor,
measuring (i) a time from transmission of information, which is transmitted from the own device (the minimum delay value calculating device) or an external device which is transmitting data, to arrival at a destination of the information as a delay or (ii) a round trip time from the transmission of the information to receipt of reply information, which is received by the own device or the external device, from the destination receiving the information as the delay;
when the measured delay is smaller than a value which is already set in the own device as a minimum delay value, setting the measured delay as the minimum delay value instead of the already set value;
determining a review timing of the set minimum delay value using a time period between a first timing when the measured delay is close to the minimum delay value, which is already set at the first timing as the latest review timing, and a second timing when the measured delay is close to the minimum delay value, which is set at the second timing after the latest review timing; and
updating the minimum delay value, at the determined review timing, to a predetermined preset initial value, or calculating the minimum delay value using the measured delay and updating the minimum delay value, at the determined review timing, to the calculated minimum delay value.

7. A non-transitory storage medium storing a computer program that when executed by a computer causes the computer to perform a method comprising:
measuring (i) a time from transmission of information, which is transmitted from the own device (the minimum delay value calculating device) or an external device which is transmitting data, to arrival at a destination of the information as a delay or (ii) a round trip time from the transmission of the information to receipt of reply information, which is received by the own device or the external device, from the destination receiving the information as the delay;
when the measured delay is smaller than a value which is already set in the own device as a the minimum delay value, setting the measured delay as the minimum delay value instead of the already set value;
determining a review timing of the set minimum delay value using a time period between a first timing when the measured delay is close to the minimum delay value, which is already set at the first timing as the latest review timing, and a second timing when the measured delay is close to the minimum delay value, which is set at the second timing after the latest review timing; and
updating the minimum delay value, at the determined review timing, to a predetermined preset initial value, or calculating the minimum delay value using the measured delay and updating the minimum delay value, at the determined review timing, to the calculated minimum delay value.

* * * * *